United States Patent

[11] 3,597,792

| [72] | Inventor | W. Lee Lockerby<br>Houston, Tex. |
|---|---|---|
| [21] | Appl. No. | 880,450 |
| [22] | Filed | Dec. 8, 1969<br>Division of Ser. No. 697,966, Jan. 15, 1968,<br>Pat. No. 3,548,449. |
| [45] | Patented | Aug. 10, 1971 |
| [73] | Assignee | Avico, Inc.<br>Houston, Tex. |

[54] CRAB MEAT EXTRACTION APPARATUS AND METHOD
6 Claims, 9 Drawing Figs.

| [52] | U.S. Cl. | 17/71 |
|---|---|---|
| [51] | Int. Cl. | A22c 29/00 |
| [50] | Field of Search | 17/71, 48, 11.1 |

[56] References Cited

UNITED STATES PATENTS

| 1,655,583 | 1/1928 | Umrath | 17/71 |
|---|---|---|---|
| 2,862,230 | 12/1958 | Corey et al. | 17/11.1 |
| 3,229,325 | 1/1966 | Amelang | 17/71 |

FOREIGN PATENTS

| 18,671 | 1909 | Great Britain | 17/71 |
|---|---|---|---|

*Primary Examiner*—Lucie H. Laudenslager
*Attorney*—R. Werlin

ABSTRACT: A machine and method for extracting meat from the body shells of crabs by the employment of centrifugal force, characterized by structures and procedures permitting operation at two different speeds operative to separately and successively extract the more valuable, relatively large lump meat sections in substantially unbroken condition; followed by extraction of the smaller, less valuable, flake meat sections.

Patented Aug. 10, 1971

W. Lee Lockerby
INVENTOR.

BY

ATTORNEY

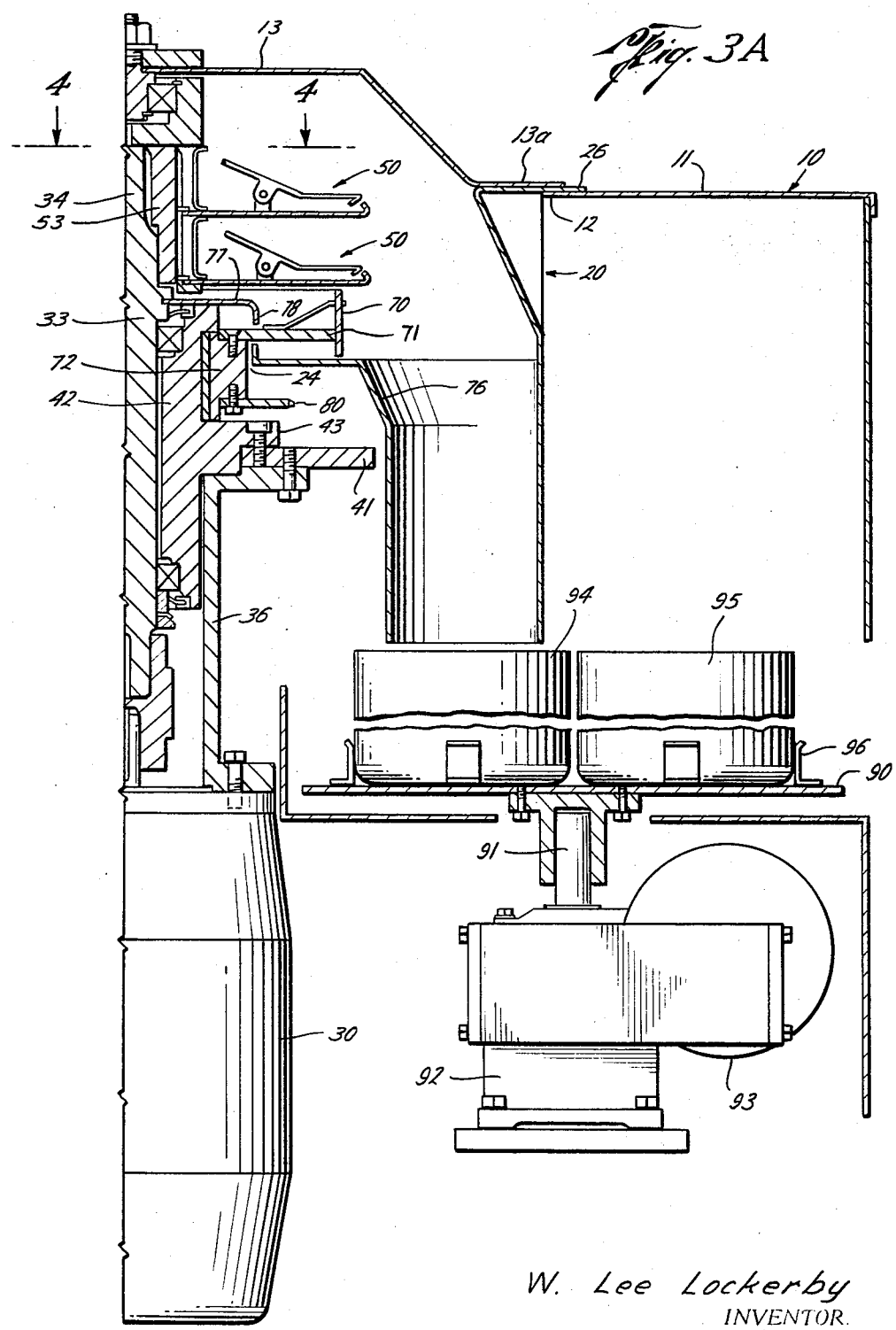

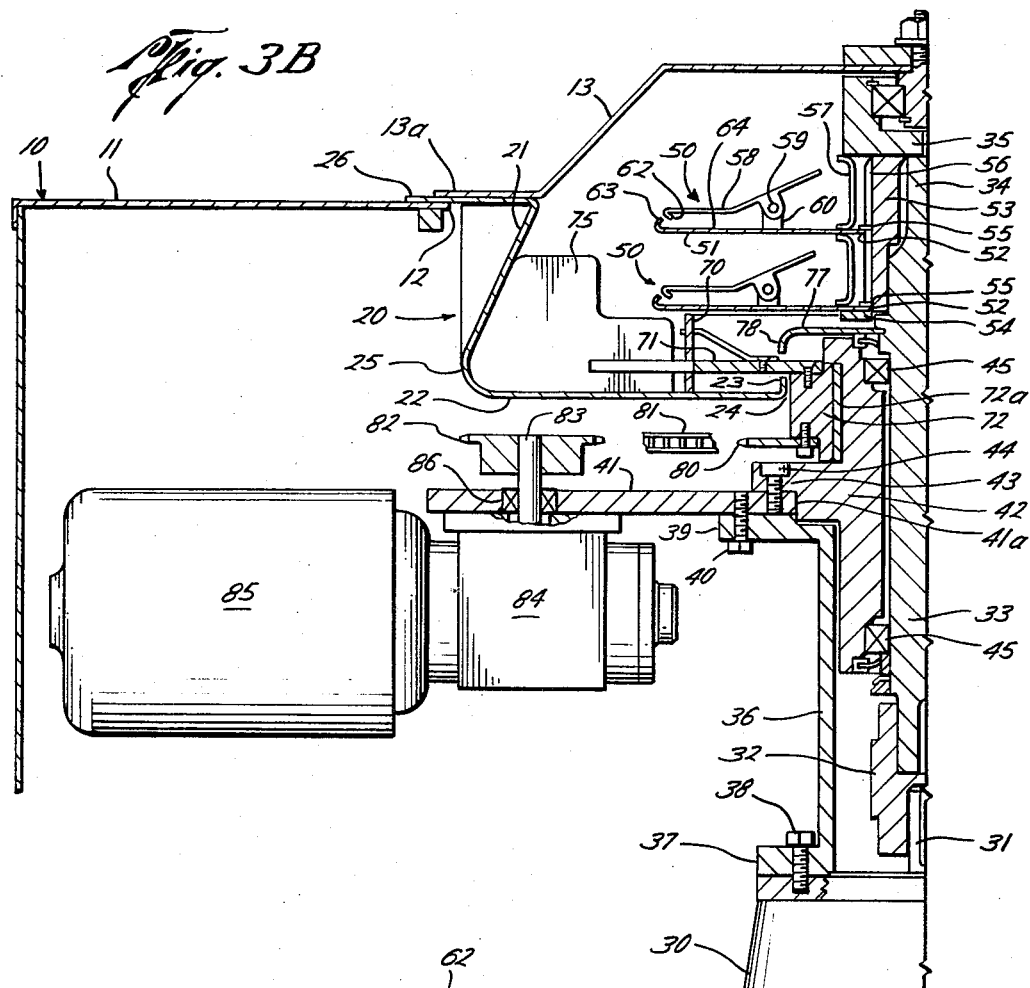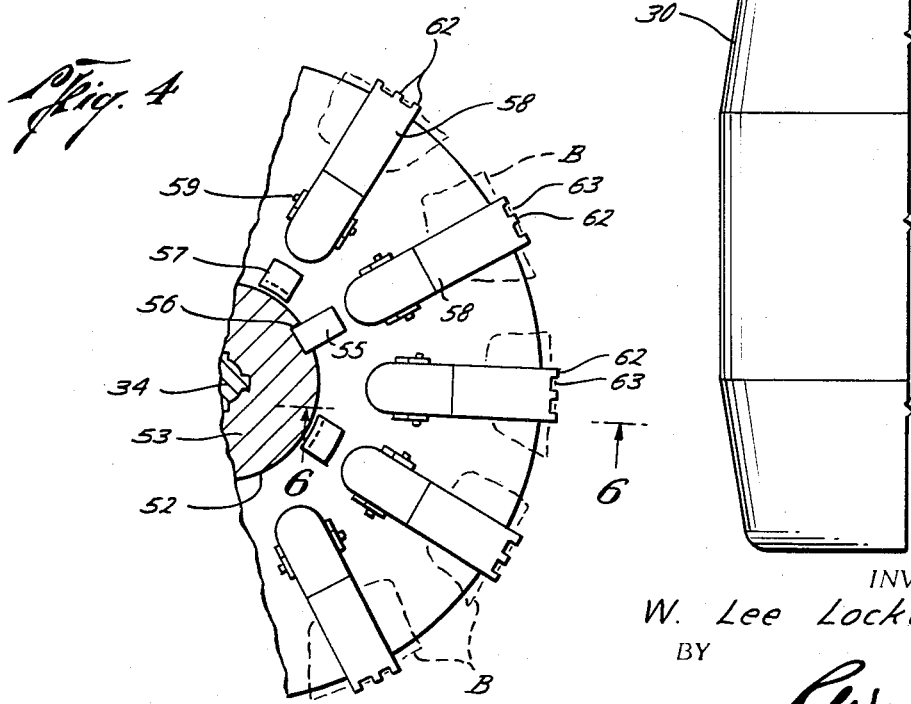

W. Lee Lockerby
INVENTOR.

BY

ATTORNEY

W. Lee Lockerby
INVENTOR.

BY

ATTORNEY

CRAB MEAT EXTRACTION APPARATUS AND METHOD

This application is a division of Ser. No. 679,966, filed Jan. 15, 1968, now U.S. Pat. No. 3,548,449, issued Dec. 22, 1970.

While numerous machines have been designed for extraction of the meat from shells of crabs, some employing centrifugal force, none, to date so far as I am aware, have proven successful for a variety of reasons, including such problems as inability to effectively separate the meat cleanly from shell fragments, inefficiency in operation, complexity of the machines, inability to extract maximum amounts of the meat, and perhaps most importantly, the inability to remove the large lump sections in broken form. As these large lump sections constitute the meat portions which bring the highest price in the market, and, therefore, are the most valuable meat portions, failure to extract these sections in lump form greatly reduces the value of the extracted meat and thereby renders such earlier machines and methods generally uneconomic.

The present invention, therefore, has for its primary objects the provision of a machine and method of operation which overcome the difficulties in prior art devices, such as are enumerated above, and provides instead a relatively simple, compact machine for this purpose and a procedure which assures maximum extraction of the meat in forms calculated to have the highest market value.

In accordance with a preferred embodiment of this invention, the machine employs an arrangement which includes carrier trays, having means for securely holding crab body sections in positions to permit expulsion of the meat under centrifugal force. The trays are mounted for rotation by a variable speed electric motor having controls selectively enabling rotation of the carriers at different speeds for predetermined time intervals such as to cause expulsion from the crab body compartments first of the lump meat sections in unbroken form, followed by expulsion of the smaller flake meat sections. Automatically timed means are also provided for separately collecting the two types of meat in sequence as produced.

Various other objects and advantages of this invention will become more readily apparent from the following detailed description when read in conjunction with the accompanying drawing which illustrates a preferred embodiment of this invention.

In the drawing:

FIG. 3A is a vertical view, partly in elevation and partly in section, of the right-hand half of the machine viewed generally transversely of the machine;

FIG. 3B is a view similar to FIG. 3A showing the complementary left-hand half of the machine;

FIG. 4 is a plan view of one of the carrier trays;

Figure 1:
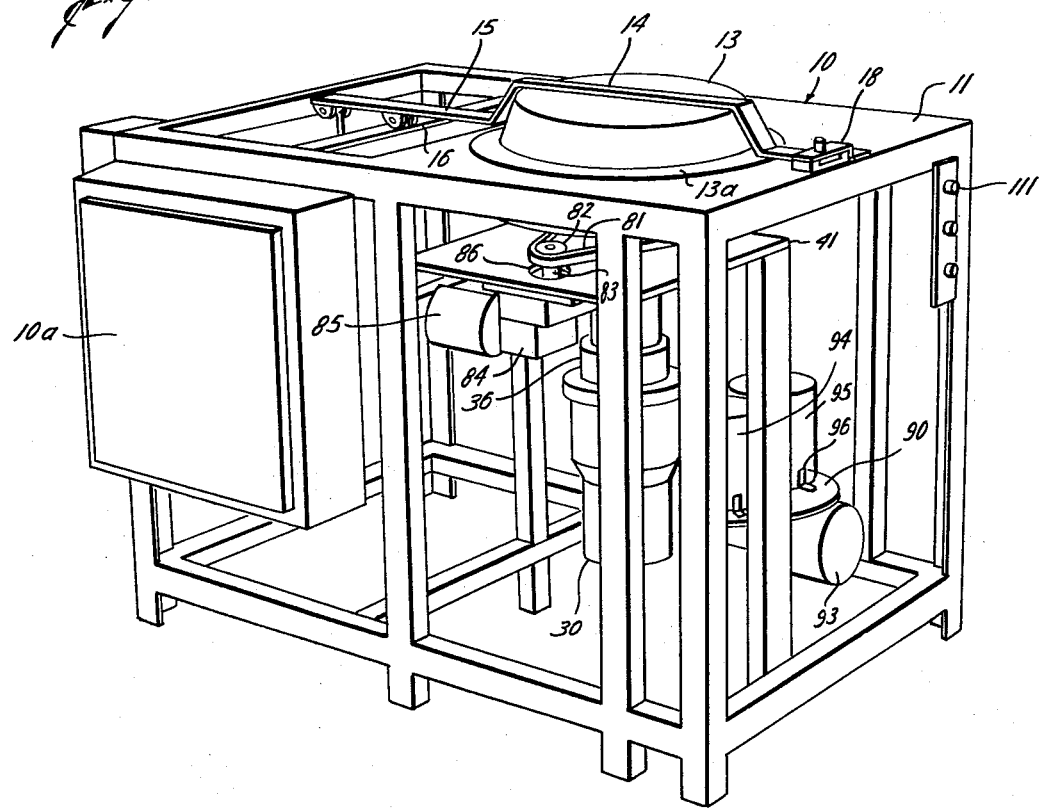
FIG. 1 is an elevational view, in perspective showing the complete machine.
Figure 2:
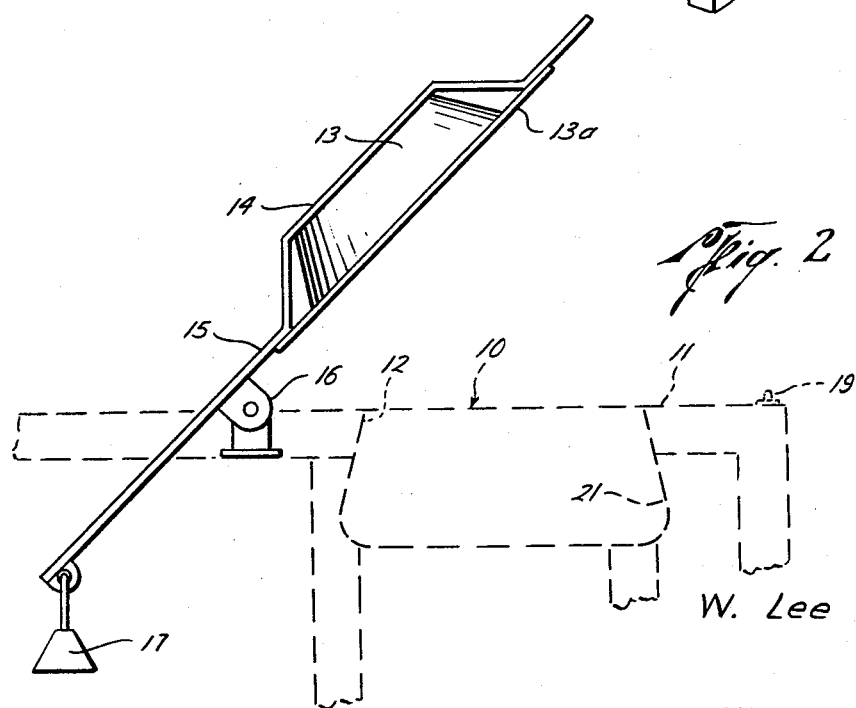
FIG. 2 is a side elevational view showing the cover for the machine.

Referring to the drawing, the machine comprises a base, designated generally by the numeral 10, constructed of conventionally arranged vertical legs and crosspieces including a top 11 having an opening 12. The opening is adapted to be closed by a dished cover 13 having an annular flange 13a about its open end and secured to a handlebar 14 having a rearward extension 15 pivotally mounted at 16 on one of the crossmembers of the frame, and carrying on its free-end a counterweight 17 designed to enable raising of the cover with a minimum of effort. The forward end of the handlebar 14 forms a tongue 14a which is disposed to be releasably locked down in closed position over opening 12 by means of a pivoted latch 18 which includes a switch element 19 arranged to activate the electrical circuits for the machine, as will be subsequently described, when the handle is in the locked position and to open or deactivate the electrical circuits when the cover is raised, as seen in FIG. 2. Base 10 has mounted thereon a cabinet 10a which houses the various electrical and electromechanical elements employed in the operation of the machine, as will be described hereinafter.

Seated in opening 12, as best seen in FIGS. 3A AND 3B, is an annular collector bowl, designated generally by the numeral 20, having a downwardly and outwardly sloping, frustoconical, peripheral wall 21, and a flat annular bottom 22 having a central opening 24 defined by an upwardly turned lip 23. The juncture of bottom 22 with peripheral wall 21 is defined by a smoothly carved portion 25. The upper end of wall 21 terminates in a radially outwardly extending flange 26 adapted to rest on the portion of top 11 defining opening 12, whereby to removably support bowl 20 in opening 12.

Disposed beneath bowl 20 is an electric motor 30 of the well know, generally conventional direct current, variable speed type, having its power shaft 31 axially aligned with bowl opening 24. Power shaft 31 is coaxially connected by means of a coupling 32 to a main drive shaft 33 which extends upwardly through bowl opening 24 and terminates in a splined end 34 abuttable by a thrust bearing 35 mounted in the center of cover 13 when the latter is in its downward or closed position as best seen in FIGS. 3A and 3B.

A tubular housing 36 surrounds shafts 31 and 33 and has a flanged lower end 37 secured by means of cap screws 38 to the upper end of motor 30 and has a flanged upper end 39 secured by means of cap screws 40 to a horizontally disposed support plate 41 suitably mounted inside base 10 to function as a firm mounting for the main elements of the machine and provided with a central opening 41a for accommodating the drive elements.

A tubular pillow block 42 is mounted in the bore of housing 36 surrounding a power shaft 33 and carries an external flange 43 intermediate its ends by which it is supported on plate 41 about opening 41a and is secured to plate 41 by means of cap screws 44. The bore of pillow block 42 carries longitudinally spaced antifriction bearings 45-45 in which drive shaft 33 is journaled.

A plurality of carrier trays, designated generally by the numeral 50 (two shown), are disposed in vertical stacked relation about upper end 34 of main drive shaft 33. Each of the trays 50 comprises a flat horizontally disposed plate 51 having a central opening 52 adapted to slip over an adapter sleeve 53 having splined connection to shaft end 34 for rotation therewith. The lower end of sleeve 53 has an outwardly extending annular flange 54 which serves as a bottom rest for the lowermost one of trays 50, each of which carries a plurality of keys 55 extending radially inwardly of opening 52 for engagement in longitudinal spline grooves 56 in the exterior of adapter sleeve 53, whereby to lock the tray to the sleeve against relative rotation thereon, so that rotation of shaft 33 will be transmitted through adapter sleeve 53 to the several trays 50. The latter are each provided with a plurality of vertically disposed, circumferentially spacer bars 57 which determine the spacing between the trays and serve to support one tray above the other.

Figure 6:
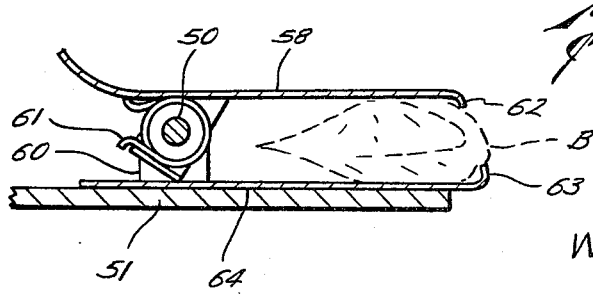
FIG. 6 is a detail in cross section of a portion of one of the clamps for holding a crab body on a carrier tray.

Each of trays 50 carries a plurality of radially extending angularly spaced clips 58 pivoted at 59 on upstanding hinge lugs 60 and biased by means of spring 61 (FIGS. 4 and 6) to normally urge the forward end of the clip carrying downwardly and slightly inwardly turned gripping teeth 62 toward complementary upwardly projecting teeth 63 carried by the forward ends of clamp plates 64 mounted on plate 51. The spring biased clips and the cooperating teeth 62,63 function to securely hold crab bodies (FIGS. 4 and 6) and restrain them against centrifugal force during rotation of the trays will be described subsequently.

Mounted in bowl 20 between wall 21 and lip 23 beneath the lowermost tray 50, is a vertically disposed retainer ring 70 which is disposed for rotation about the axis of the bowl in close sliding relation to bottom 22 of the bowl. Ring 70 serves as an inner wall of the bowl to confine meat deposited in the bowl during operation of the machine, as will appear subsequently. Ring 70 is secured by means of a plurality of radial spokes or arms 71 to the upper end of a hub 72 which is rotatably mounted on an antifriction bearing 72a about pillow block 42 above flange 43.

One of the arms 71 projects through ring 70 to provide an extension 74 which is rigidly secured to a vertically disposed wiper or scraper blade 75 extending radially between wall 21 and ring 70 and having a peripheral shape conforming closely to the shape of bowl 20 as defined by wall 21, bottom 22 and portion 25. As so formed, blade 75 will act to scrape the meat accumulating in bowl 20 between wall 21 and ring 70 around the interior of the bowl 20 toward a discharge duct 76 opening through bottom 22 of the bowl in response to rotation of arms 71 by hub 72, as will be described subsequently.

A horizontally disposed guard plate 77 is mounted to main shaft 33 just above the upper end of pillow block 42 and has its outer periphery formed to provide a downwardly turned lip 78 which terminates just above arms 71 and in alignment with lip 23 of bowl 20. Guard plate 77, which rotates with shaft 33, functions primarily to exclude meat particles or other detritus from falling into the parts of the machine below bowl 20 during operation of the machine.

Hub 72, with its connected elements, is driven independently of the drive for main shaft 33, and he drive elements for hub 72 include a sprocket 80 secured to hub 72 and driven by means of a chain belt 81 from a second sprocket 82 which is mounted on a shaft 83 driven through a gearbox 84 by an electric motor 85, herein termed the wiper motor, the gearbox and motor being suitably mounted beneath plate 41, with shaft 83 extending upwardly through an opening 86 in plate 41, as best seen in FIG. 3B.

Mounted in base 10, generally beneath the lower end of discharge duct 76, is a horizontally disposed turntable 90 mounted for rotation on a shaft 91 extending upwardly from a gearbox 92 drivingly connected to an electric motor 93, herein termed the indexing motor. Turntable 90 is adapted to support a pair of receptacles 94 and 95 which are alternatively rotated to positions beneath the discharge end of duct 76 to respectively receive the different types of crab meat extracted during operation of the machine, which will be described subsequently. The receptacles 94,95 are held in place on turntable 90 by means of spring clips 96.

Figure 5:
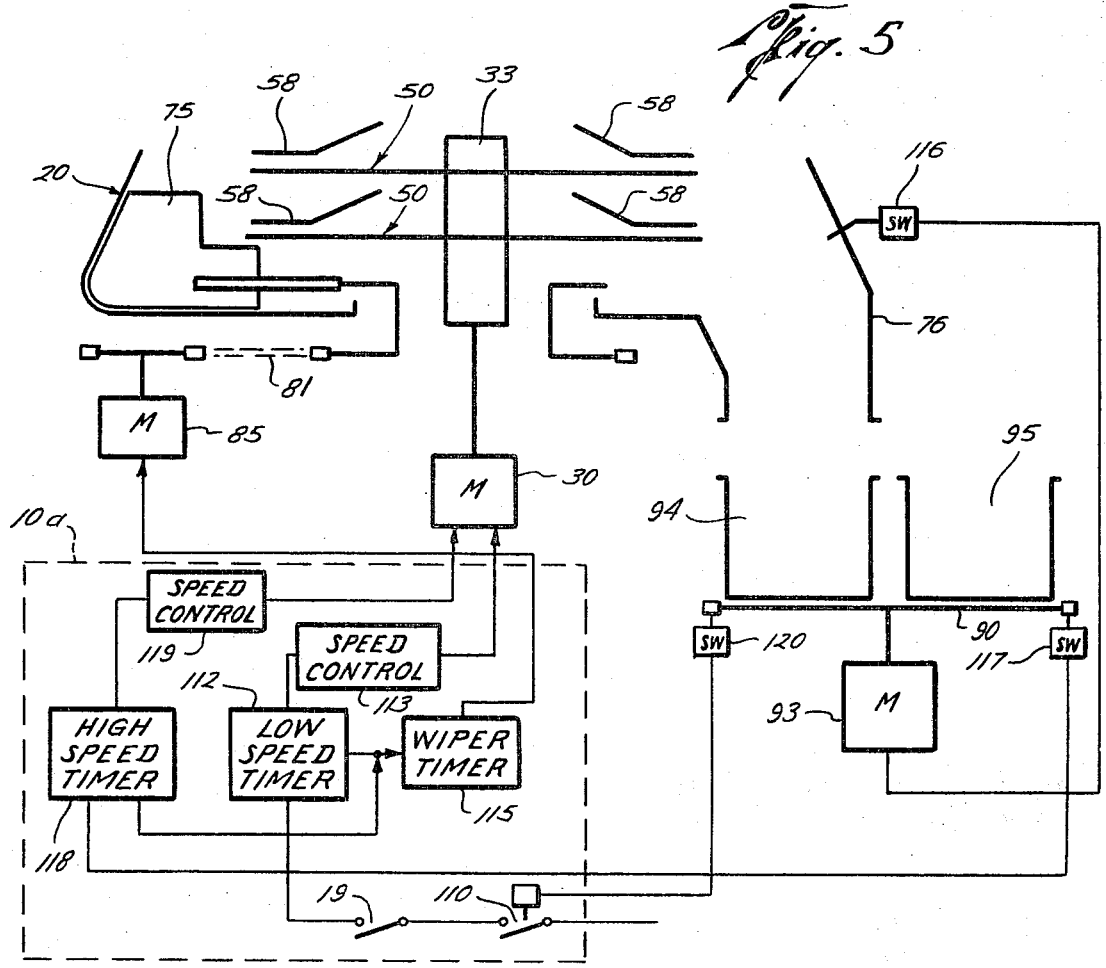
FIG. 5 is a diagrammatic illustration of the several elements of the machine showing the electromechanical circuits and connections for operating and controlling the machine.

Operation of the machine will now be described, reference being had particularly to FIG. 5 which diagrammatically illustrates the electromechanical connections employed in the operation of the machine.

It will be understood that the crabs first will have been cooled in the conventional manner, after which the carapace is removed, as well as the stomach and its contents, leaving the cleaned body from which the claws, crawlers, and paddle elements will be removed at the knuckles. The body B (FIGS. 7 and 8) will then be cut in two along both sides of the center partition which will serve to remove the latter, thereby providing two half-body sections S,S, having the inner ends of the several body compartments containing the cooked crab meat open and exposed.

Figure 7:
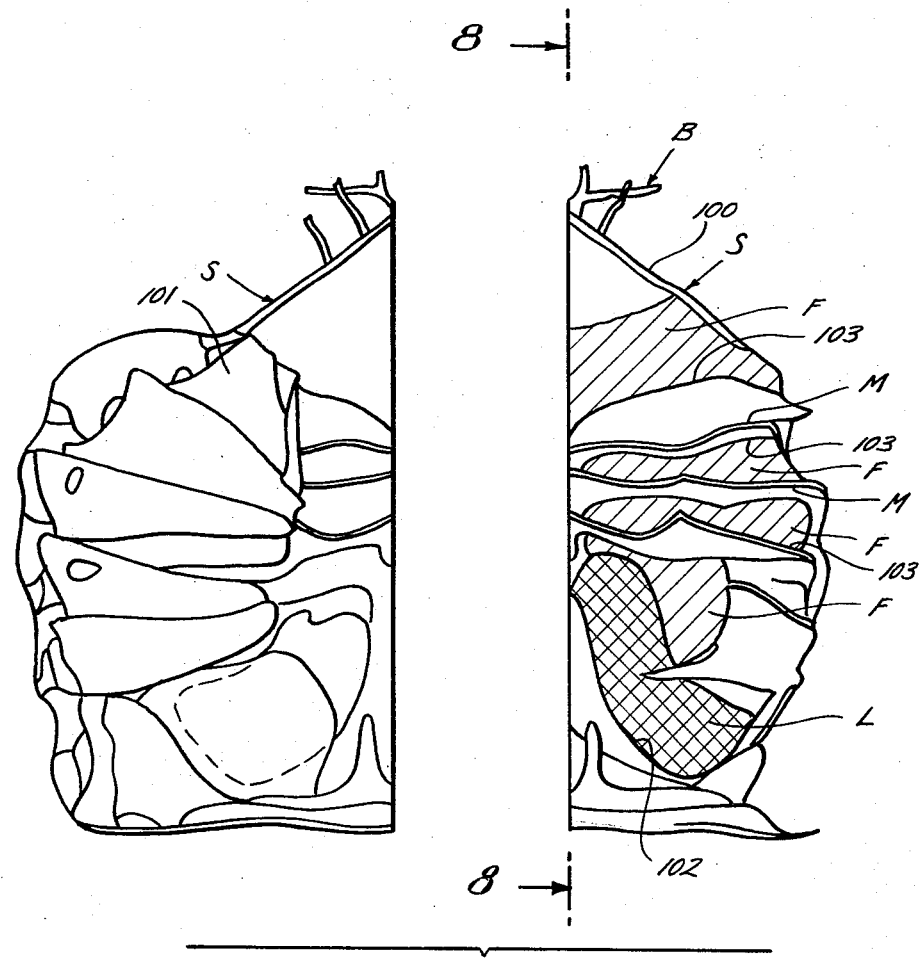
FIG. 7 is a diagrammatic view showing the two-half portions of a crab as prepared for placing in the machine and illustrating the various partitions defining the meat-enclosing compartments of the body shell.
Figure 8:
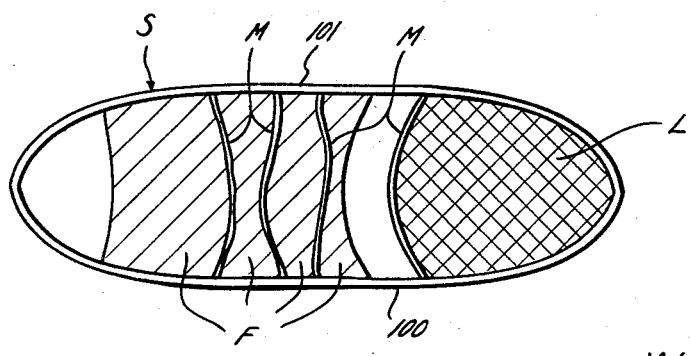
FIG. 8 is a cross-sectional view taken generally along line 8-8 of FIG. 7.

By reference to FIGS. 7 and 8, it will be seen that each half-body section S comprises upper and lower shells 100 and 101, respectively, divided, generally transversely, by a plurality of thin shell partitions M to form a plurality of meat-containing compartments, the rearmost one of which in the body portion is designated by the number 102, and is substantially larger than the other compartments, each numbered 103. The meat, designated L, contained in compartment 102 constitutes that meat portion which is conventionally referred to as the "lump" meat, being a portion of substantially larger dimensions than the meat portions, designated F, in the compartments 103.

It will be understood that the rotational speeds and the time interval employed for the successive meat extraction stages may be varied widely as may be desirable or necessary to attain the desired separate extraction and collection of the two different kinds of meat. The type of crab meat and the sizes will be factors to be considered in establishing the speeds and operating intervals.

It will be understood that the various electrical and electromechanical elements employed in the operation of the machine are all generally conventional and well known devices, and their details do not form a part of the present invention.

By means of the apparatus and method of operation heretofore described, it is possible not only to extract a maximum amount of the meat from the crab body shells but also to recover maximum amounts of the lump crab meat sections in unbroken form. All of the crab meat will also be extracted cleanly and free of any shell particles so that even the lower valued flake meat will be marketable at highest prices. Also, removal of the crab meat in the manner described eliminates manual handing, as is more commonly required, and thereby permits highly sanitary processing, and thus greatly reducing the danger of contamination.

It will be understood that various modifications and alternations may be made in the details of the apparatus and in the procedures heretofore described within the scope of the appended claims but without departing from the spirit of this invention.

I claim:
1. Apparatus for centrifugally extracting meat from crabs, comprising:
   a. holder means mounted for rotation including
   b. clamp means for gripping crab body sections in positions presenting open ends of the meat containing compartments thereof radially outwardly with respect to the axis of rotation of the holder means,
   c. power drive means for rotating said holder means,
   d. time-speed control means for said power drive means operable to cause said holder means to be rotated at at least two different predetermined speeds for predetermined time intervals, and
   e. means for separately collecting the meat sections extracted at the respective speeds.

2. Apparatus for centrifugally extracting meat from crabs, comprising:
   a. a base frame.
   b. crab-holder means mounted in the frame for rotation about a vertical axis, and including
   c. clamp means for gripping crab body sections in positions to present open ends of the meat-containing compartments thereof radially outwardly with respect to said axis,
   d. an annular bowl member supported in said frame concentrically about said axis to receive meat centrifugally extracted from said body sections,
   e. a power drive means mounted in the frame for rotating said holder means,
   f. time-speed control means for said power drive means operable to cause said holder means to be rotated at successively lower and higher predetermined speeds each for a predetermined time interval, whereby to effect separated extraction from said body sections first of the lump meat portions and second of the flake meat portions, and
   g. means for separately removing said portions from said bowl.

3. Apparatus according to claim 2 wherein said crab-holder means comprises,
   a. a plurality of vertically spaced, horizontally disposed annular trays,
   b. each of said trays carrying a plurality of said clamp means circumferentially spaced about the tray.

4. Apparatus according to claim 2 wherein said bowl member comprises,
   a. a horizontally disposed bottom plate,
   b. a downwardly and outwardly tapering frustoconical outer wall, and
   c. a smoothly curved section joining the lower end of said outer wall to said bottom plate.

5. An apparatus according to claim 2 wherein said last mentioned means includes:
   a discharge duct from said bowl member,
   b. a wiper member rotatable in said bowl member for moving meat accumulating in the bowl member toward said duct,
   c. drive means for rotating said wiper member,
   d. means associated with said time-speed control means actuable at the end of each of said time intervals to activate said drive means, and
   e. indexing means for alternately positioning separate receptacles in meat-receiving relation to said duct at said end of each said time interval.

6. Apparatus according to claim 5 wherein said indexing means includes:
   a. a turntable supporting said receptacles,
   b. indexing drive means for rotating said turntable, and
   c. signal means actuated by the attainment of a terminal position by said wiper member to activate said indexing drive means.